United States Patent
Waltman

(10) Patent No.: US 8,706,842 B2
(45) Date of Patent: Apr. 22, 2014

(54) DISCOVERING AND INTERACTING WITH SERVICE PROVIDERS

(75) Inventor: David Wayne Waltman, Lake Stevens, WA (US)

(73) Assignee: Microsoft Corporation, Redmond, WA (US)

( * ) Notice: Subject to any disclaimer, the term of this patent is extended or adjusted under 35 U.S.C. 154(b) by 912 days.

(21) Appl. No.: 12/276,709

(22) Filed: Nov. 24, 2008

(65) Prior Publication Data

US 2010/0131629 A1    May 27, 2010

(51) Int. Cl.
*G06F 15/16* (2006.01)
*G06F 3/048* (2013.01)

(52) U.S. Cl.
USPC .......................... 709/219; 715/825

(58) Field of Classification Search
USPC .......................... 709/219; 715/825
See application file for complete search history.

(56) References Cited

U.S. PATENT DOCUMENTS

| | | | |
|---|---|---|---|
| 6,405,225 B1 | 6/2002 | Apfel et al. | 707/526 |
| 6,654,735 B1 * | 11/2003 | Eichstaedt et al. | 707/749 |
| 6,704,403 B2 | 3/2004 | Lurie et al. | 379/114.1 |
| 6,721,736 B1 * | 4/2004 | Krug et al. | 707/634 |
| 6,753,887 B2 | 6/2004 | Carolan et al. | 345/764 |
| 6,934,697 B1 | 8/2005 | Warren | 707/1 |
| 2002/0111848 A1 | 8/2002 | White | 705/10 |
| 2003/0222897 A1 | 12/2003 | Moore et al. | 345/705 |
| 2006/0129931 A1 * | 6/2006 | Simons et al. | 715/705 |
| 2007/0088687 A1 * | 4/2007 | Bromm et al. | 707/4 |
| 2007/0204233 A1 | 8/2007 | Savage et al. | 715/747 |
| 2008/0086368 A1 * | 4/2008 | Bauman et al. | 705/14 |
| 2009/0030775 A1 * | 1/2009 | Vieri | 705/10 |
| 2010/0017289 A1 * | 1/2010 | Sah et al. | 705/14.49 |

OTHER PUBLICATIONS xcDirectory v3.x Administrator's Guide, 2006, Retrieved from the Internet <URL:xcent.com/downloads/GetFile.asp?file=xcDirectory+v3.x+Administrators+Guide.pdf&ProdCode=>, pp. 1-58 as printed.*
No stated author, Mantis Manual, Aug. 2003, Retrieved from the Internet <URL:mantisbt.org/manual/manual.configuration.file.upload.php>, pp. 1-2 as printed.*
Online Print Wizard Service Provider SDK, Microsoft Corporation, Aug. 2006, http://msdn.microsoft.com/en-us/library/bb643801.aspx.
Pattison, Ted, *Gathering MOSS: New Dev-Centric Features in Office SharePoint Server Keep Your Apps Rolling*, Microsoft Corporation, 2008, http://msdn.microsoft.com/en-us/magazine/cc163560.aspx.
Trevor, Jonathan, David M. Hilbert, Bill N. Schilit, and Tzu Khiau Koh, *From Desktop to Phonetop: A UI for Web Interaction on Very Small Devices*, Nov. 11-14, 2001, http://schilit.googlepages.com/p121-trevor.pdf.

* cited by examiner

*Primary Examiner* — Michael Chao
(74) *Attorney, Agent, or Firm* — Rachael Vaughn; Jimm Ross; Micky Minhas

(57) ABSTRACT

Embodiments provide searching features and functionality that can be used to provide service provider data, but are not so limited. In an embodiment, a computing system can include a client application or client that includes functionality to provide a number of service providers associated with a particular function, service, and/or other provider feature(s). In one embodiment, a computing device can include a client that can be used in conjunction with other end-user applications to automatically provide a number of service providers based in part on a user request.

19 Claims, 8 Drawing Sheets

DISCOVERING AND INTERACTING WITH SERVICE PROVIDERS

BACKGROUND

Computing systems and applications continue to play important roles in our daily activities. Business and casual users have a variety of options at their disposal when selecting a cellphone or smart phone, portable digital assistant (PDA), laptop, desktop, server, etc. and related applications. Processing and memory advances enable application developers to develop more and more complex and user-friendly end-user applications. Furthermore, wireless and/or wired communication architectures enhance information sharing and locating capabilities. For example, users can now surf for information on the Internet using a web browser installed on a smart phone. Dedicated web sites, search engines, and other resources can be used in attempting to provide information to a requesting user in an efficient and timely manner.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments provide searching features and functionality that can be used to provide service provider data, but are not so limited. In an embodiment, a computing system can include a client application or client that includes functionality to provide a number of service providers associated with a particular function, service, and/or other provider feature(s). In one embodiment, a computing device can include a client that can be used in conjunction with other end-user applications to automatically provide a number of service providers based in part on a user request.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

Embodiments provide searching features and functionality that can be used to provide service provider data, but are not so limited. In an embodiment, a computing environment includes one or more user devices, wherein each device can include a client application or client that includes functionality to locate and present service provider data based in part on a client request. For example, each device client can operate to provide a number of service providers associated with a particular function, service, and/or other provider feature(s). In one embodiment, a computing device can be configured with a service provider client that can be used in conjunction with other end-user applications to present a number of service providers based in part on a user request and/or location. For example, features of the service provider client can be configured as part of a computer-readable medium, having executable instructions, which can be used to locate and present service provider data.

Figure 1:
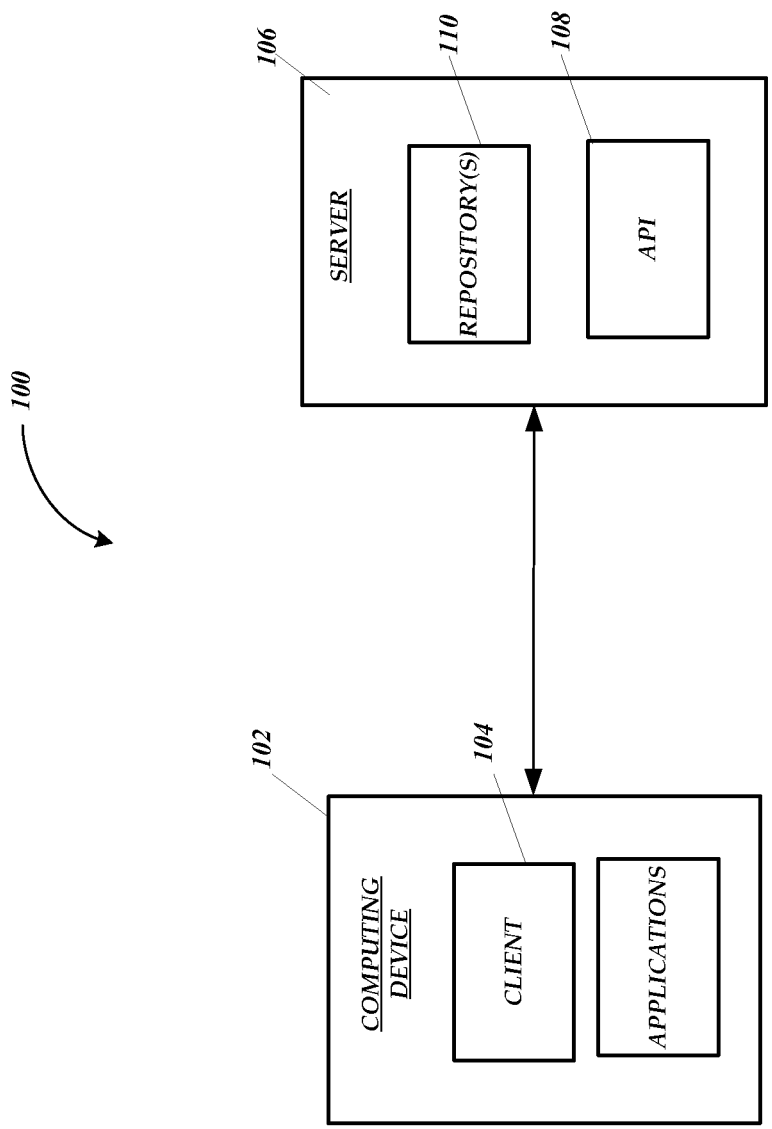
FIG. 1 is a block diagram of an example computing environment that can be configured to provide service provider and other functionality.

FIG. 1 is a block diagram of components of an exemplary computing environment 100 that can be configured to provide service provider information, but is not so limited. In accordance with various embodiments, components of the computing environment 100 can be configured to provide service provider functionality and other features, as described below. Components of the environment 100 can be configured with functionality to provide a number of relevant service providers to a requesting client, wherein the relevant service providers can be associated with a particular service, good, function, and/or affiliation for example.

The computing device 102 includes at least one processor and memory that can be used to execute user and other applications of the computing device 102, including a client 104. For example, the computing device 102 can be configured as a desktop, laptop, handheld, tablet, or other computing device. According to an embodiment, the client 104 can be configured and used to provide a number of service providers in the context of a particular end-user application. For example, the client 104 can be integrated with an end-user application or a suite of user applications (e.g., Office® applications for example), and tailored to expose a number of service providers associated with a type of service/good. In one embodiment, the client 104 can request and/or present service provider data based in part on a type of provider request, a requesting location, and/or a context of an associated end-user application.

For example, the client 104 can be used in conjunction with a word processing application to locate a resume service provider within a definable region that is associated with the user's current location, such that relevant service providers from Canada, Mexico, and the United States are presented but not for Russia, China, Australia, etc. As another example, the client 104 can also be used in conjunction with a spreadsheet application to locate accounting services for providing a particular type of accounting service. As yet another example, the client 104 can be used by a browsing application to locate Internet hosting service providers associated with an advertising model.

End-user applications may be local, web-based, and/or other types of applications. In other embodiments, relevant service providers may be returned according to a language, political boundaries, age, combinations of such factors, etc. As another example, a publishing application may use the client 104 with input features to expose electronic mail campaign service providers, marketing providers, etc. in the context of the publishing application. As yet another example, a human resources application may use the client with input features to locate relevant job posting providers. Accordingly, each application can use a client 104 having a particular user interface and/or associated search functionality that can be configured according to a desired implementation.

With continuing reference to FIG. 1, and according to one embodiment, the client 104 can operate to communicate with at least one serving device or server 106 to locate a number of relevant service providers based in part on a location of an end-user using the client 104 to issue a search request for relevant service providers. For example, the client 104 can be configured to send a hypertext transfer protocol (HTTP) request associated with a service provider request to one or more remote servers having databases (e.g., Sharepoint®, etc.) that include service provider data for a particular region associated with a user's current location.

In an embodiment, a user interface can be associated with the client 104 and also included as part of an end-user application (see examples of FIGS. 3A-3F). In one embodiment, the user interface can be tailored to a particular search type according to an application context, a service type, and/or other factors. For example, an exemplary search interface that may be associated with client 104 can be configured with input features to locate web hosting providers when a user would like to make a post but does not have a web hosting provider. Accordingly, the user interface can be used by a user to search for service providers, wherein the client 104 can issue a service provider request to the server 106 based in part on the service provider search.

After receiving a request, components of the server 106 can operate to return relevant service provider data based in part on the request. Moreover, in various embodiments, the server 106 can be configured to provide web hosting functionality, document storage functionality, navigation functionality, search functionality, application integration functionality, interactive functionality, personalization functionality, and other functionality. Additionally, the server 106 can include various functionality and other components, such as a front-end functionality, web servicing functionality, metadata managing functionality, markup language functionality, etc.

The client 104 and server 106 can be configured to communicate using a number of application programming interfaces (APIs). For example, a communication protocol can use a markup language and associated data to communicate information between the client 104, server 106, and/or other components. In an embodiment, an application programming interface (API) 108 can be used in conjunction with the server 106 to package service provider data for a requesting client, such as client 104 for example. For example, the API 108 can be configured to package extensible markup language (XML) data associated with one or more relevant service providers located in a repository 110 of the server 106, and return the packaged XML data to the client 104 for further use.

While the repository 110 and API 108 are shown to be included with the server 106, each component of the environment 100 can be configured as a stand-alone component, or integrated with another component or components in alternative embodiments. Additionally, the service provider data in repository 110 can include information associated with capabilities and/or other aspects of particular service providers. For example, the service provider data can be organized as one or more data structures (e.g., a Sharepoint® list, etc.) that include organized service provider data in the repository 110. The service provider data can be manually input and/or pulled from service provider records, web sites, and/or other sources.

In one exemplary configuration, the repository 110 can be populated with service provider data associated with a type of service, location of a service organized by a geographic region (e.g., country, state, city, province, etc.), preexisting relationships with and/or between service providers, and/or other service provider factors. Other exemplary service provider data may include that the service provider: provides a specific type of service at some hourly cost; charges a flat fee for certain services; can accept a direct posting of a web page; can accept uploaded files which may be limited by type and size; etc.

Figure 3A:
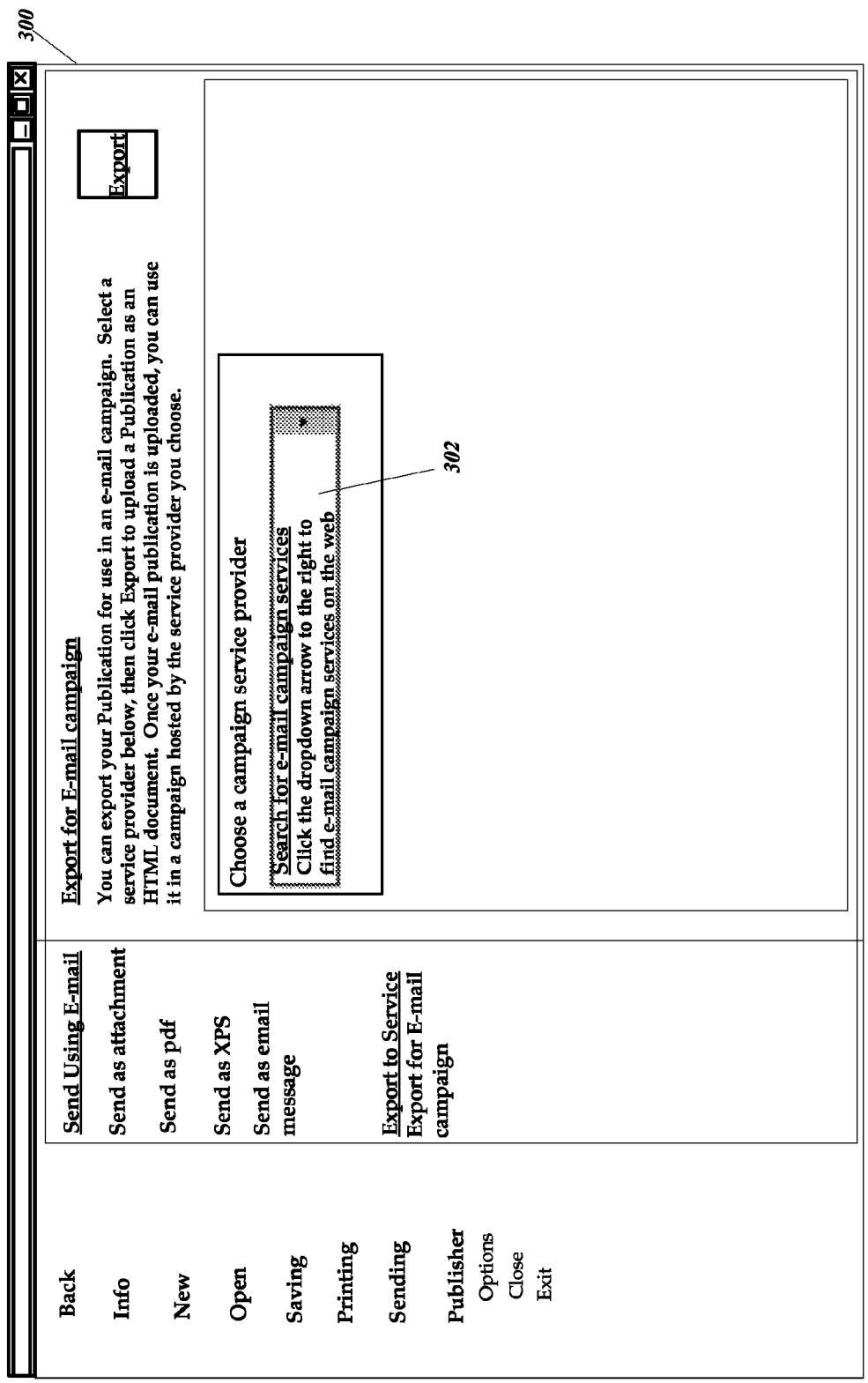
FIGS. 3A-3F depict aspects of an exemplary user interface that can be used to search for and present service provider data.
Figure 3B:
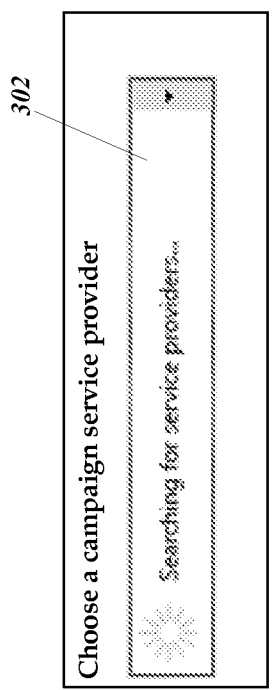
Figure 3C:
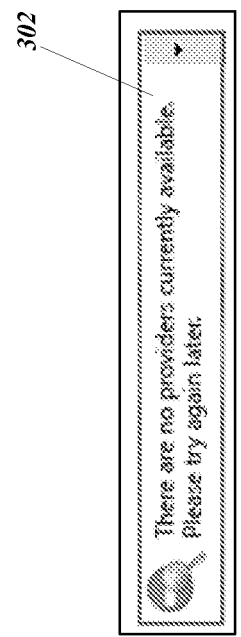
Figure 3D:
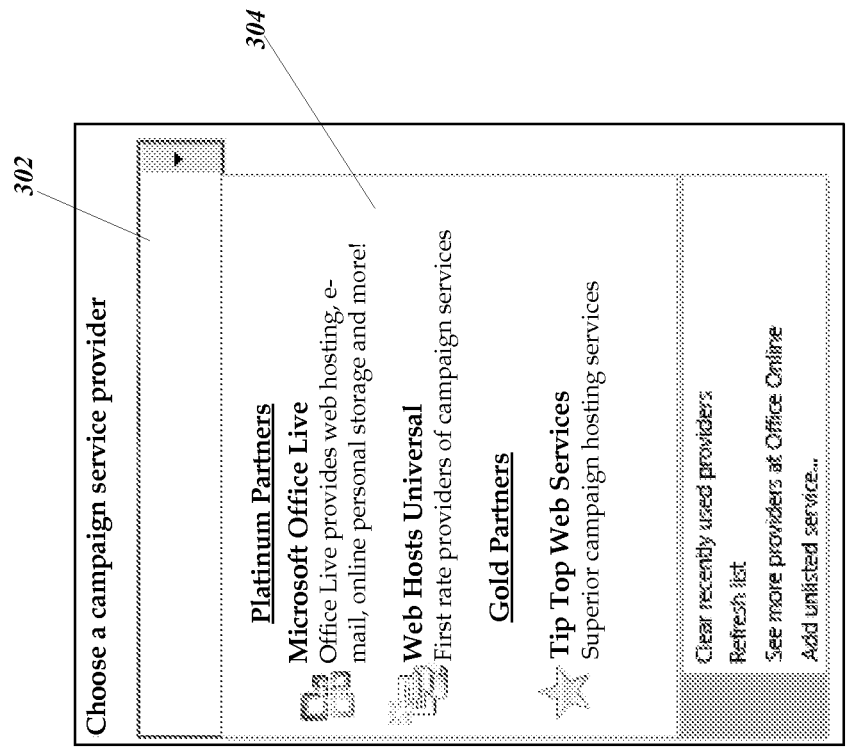

In one embodiment, the client 104 can use service provider data returned from the API 108 to populate a gallery of service providers in a user interface (see the example of FIG. 3D). The client 104 may present the returned service provider data based in part on a type of affiliation or other association. For example, service providers can be organized and delineated according to a number of defined groups (e.g., platinum, gold, etc.) based in part on advertising agreements associated with a number of business partners that include relevant service providers in a particular area or region.

A relevant service provider can be selected by the user which may direct the user to the service provider's web site or a web site that provides additional information with respect to the selected service provider. If no relevant service providers are located, the API can be configured to return an error message or a message to inform the user of such a result. Correspondingly, the user does not have to leave the current application to perform a separate search to locate relevant service providers.

Figure 2:
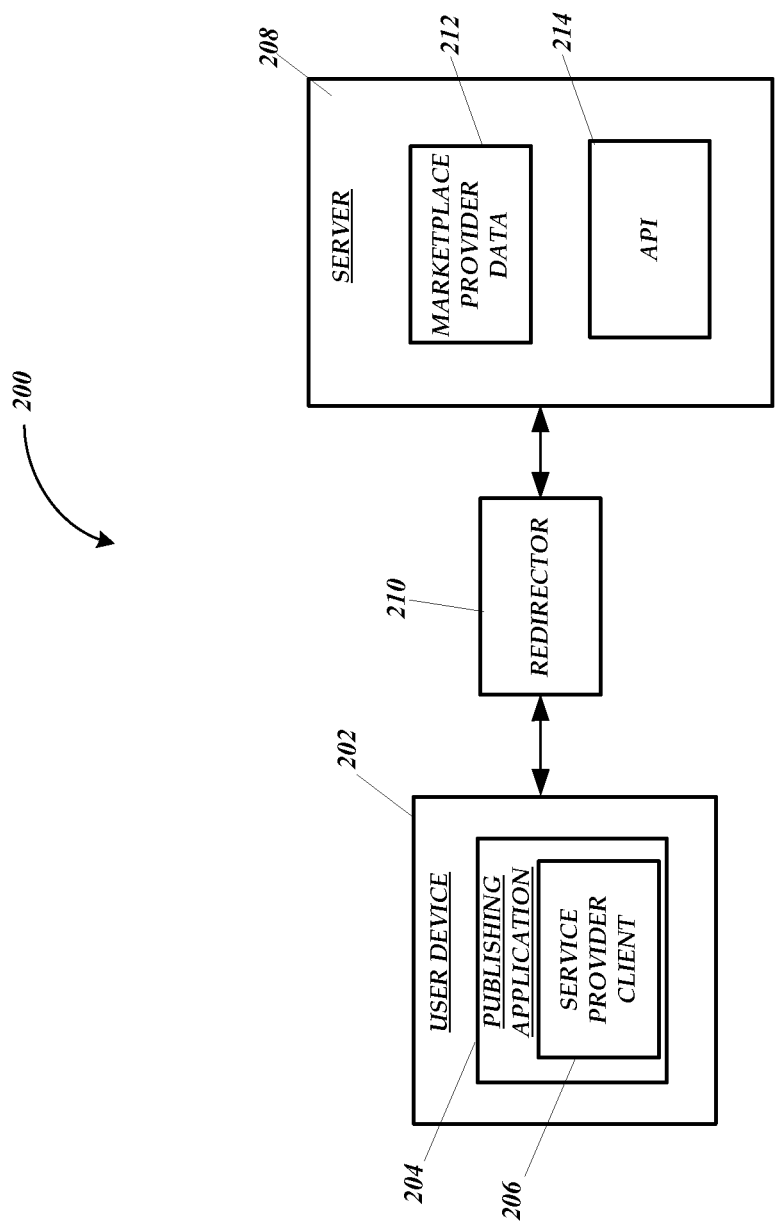
FIG. 2 is a block diagram of exemplary components of a computing system that can be configured to locate and present service provider data.

FIG. 2 depicts an exemplary computing system 200 that includes a user device 202 including user and other applications. As shown in FIG. 2, the user device 202 includes a publishing application 204 and a service provider client 206. For example, a user may be using the publishing application 204 to create a publication to market a brand of product or service, to make an announcement, etc.

With additional reference to FIGS. 3A-3F an exemplary user interface 300 associated with a publishing application is shown including a search interface 302 that is associated with the service provider client 206. As described above, the service provider client 206 can be configured to locate and present one or more service providers to an end-user. In this example, the user would like to create a publication and disseminate the publication using e-mails.

Correspondingly, for this example, the service provider client 206 can be configured to search for relevant electronic mail campaign providers. Additionally, as shown in the exemplary user interface of FIG. 3A, a user can interact with search interface 302 to locate relevant electronic mail campaign providers. Upon executing a search, the service provider client 206 communicates a request to a server 208 that includes data associated with the request that can be used to locate relevant service providers. As shown in FIG. 3B, the search interface 302 can inform the user of a pending search while the search is executing. As shown in FIG. 3C, the search interface 302 can inform the user when no service providers are located.

In an embodiment, and referring again to the example of FIG. 2, a client request can be directed to a redirector 210 that can use information associated with the client request to direct the request to an appropriate server or other component. For example, the redirector 210 can use location data in the request to direct the request to a marketplace provider database 212. In one embodiment, the request can include location data associated with the location of a computing device being used to issue a service provider request or search for a predefined service/good.

As one example, a location identifier ((LCID) for example) associated with one or more resident applications can be packaged with a request and used to identify the location of the user to locate relevant service providers. As another example, global positioning satellite (GPS) and other location technology can be used to determine the location of the user, wherein the determined location can be included in a request to locate relevant service providers according to a geographical area or other defined region. Accordingly, location and/or other information can be used to fetch appropriate service provider data for an associated request. Moreover, relevant service provider data returned to a requesting client may be different according to a particular location.

In one embodiment, an API 214 or other code can use a schema to populate relevant service provider data associated with registered service providers from the marketplace database 212. One exemplary schema can include the following, but is not so limited.

ProviderName—Provider name not longer than 40 characters;

Advertisement—Advertisement text not longer than 120 characters;

Brand_or_otherIcon—a number of pixels (e.g., 32×32, etc.) or file size;

PrimaryURL—Primary uniform resource locator (URL) for provider site;

AcceptUploads—Accept Upload parameter (T/F);

MaxFileSize—Maximum file size to upload parameter (e.g., up to about 5 MB);

ProviderTier—Provider Tier parameter (level 1 through n);

ProviderTierMessage—Provider Tier Message 1-4 (alpha strings);

TierHeading—Tier Heading (1 through n) with strings (alpha); and,

AppearanceOrder—Appearance Order of providers (1-x).

In an embodiment, returned service provider data can also include a current URL for browsing to additional providers on an external website, which can include a service name string. Other exemplary schema can include fewer, more, and different elements.

Correspondingly, the API 214 can be used to communicate the relevant service provider data to a requesting client.

In accordance with an embodiment, the service provider client 206 can operate to group returned service provider data according to a desired grouping and/or delineation. For example, the service provider client 206 can group returned service provider data according to a number of tiers or levels. Fonts, sizing, and/or colors can also be used to differentiate different service providers and/or relationships. In one embodiment, the tiers or levels correspond to a service provider or other relationship. According to the example shown in FIG. 3D, the API 214 has returned three (3) relevant service providers that the service provider client 206 has grouped by presenting data for two (2) of the relevant service providers as Platinum Partners and one (1) of the relevant service providers as a Gold Partner. As shown, advertising text can be included to differentiate service providers and/or services/goods.

As described above, once received, the service provider client 206 can parse the returned service provider data to populate a gallery 304 (see example of FIG. 3D) with relevant service providers. For example, the service provider client 206 can use returned service provider data and a schema to organize and present the returned service provider data according to a desired view. Accordingly, in accordance with an embodiment, the client 206 can be configured to use a schema and other features to manage layout, population, and/or presentation of a service provider gallery with service provider data. In various embodiments, the functionality of the client 206 can be tailored according to a particular implementation.

For example, the service provider client 206 can use one or more of the exemplary schema elements to populate a gallery as follows:

1. The lowest numbered Tier Heading provided appears at the top of the gallery in a distinctive font and/or color.

2. The lowest numbered Provider Tier providers appear in the Appearance Order specified.

3. An icon, provider name and/or advertisement text can be populated in the gallery.

4. The next lowest numbered Tier Heading and associated providers appear next, etc. and, 5. If Tier Headings are not supplied, data can be displayed in Appearance Order.

Additionally, the gallery 304 can be refreshed on first dropdown during a given search session. As shown in FIG. 3D, in addition to the populated service provider data, the dropdown can be configured to include a number of user options. Exemplary user options may include a clear recently used providers option, a refresh list option, a see more providers option which may navigate to a provided URL, an add unlisted service option which can operate to launch an add service dialog, etc. For example, the clear recently used providers option can be used to clear most recently used service provider data.

In one embodiment, a predetermined number of most recently used service providers can be displayed at the top of an associated gallery, before all tier headings. A list of most recently used service providers can be populated by selecting a provider from the list and leaving the gallery. For example, a new user selection can demote the first position to second and the third out of the most recently used service provider list. If no provider is selected when a gallery is first dropped and populated, the highest ranking (highest tier, highest appearance order) item can be made to appear in the gallery window and/or recently used service provider list. When the gallery is closed, the top service provider data or some portion can remain displayed in the search window. If a new search is performed, and if a recently used service provider data is not returned, that provider may not be removed from the recently used service providers list unless cleared by the user.

As another example, if the add unlisted service option is selected, the client 104 can operate to launch a dialog with edit boxes labeled with strings. For example, the strings may include "Enter Provider location inside a first edit box; Example—http:\\www.myprovider.com" and "Enter Provider name inside a second edit box; Example—My Provider" along with "ok" and "cancel" buttons. User added services can appear with or without icons, populated in a gallery after all other entries, and/or listed in the recently used service providers list after being selected by a user.

In various embodiments, advertising and monetization models can be used to produce revenue from such an interactive interface. For example, the client may communicate a charge receipt so that a charge may be accounted for according to an advertising relationship when a user selects one or more of the returned service providers according to a partner level or other factor. As another example, a service provider partner may receive a credit or other value if associated service provider data is retrieved from a repository and/or populated in the gallery 304.

Figure 3E:
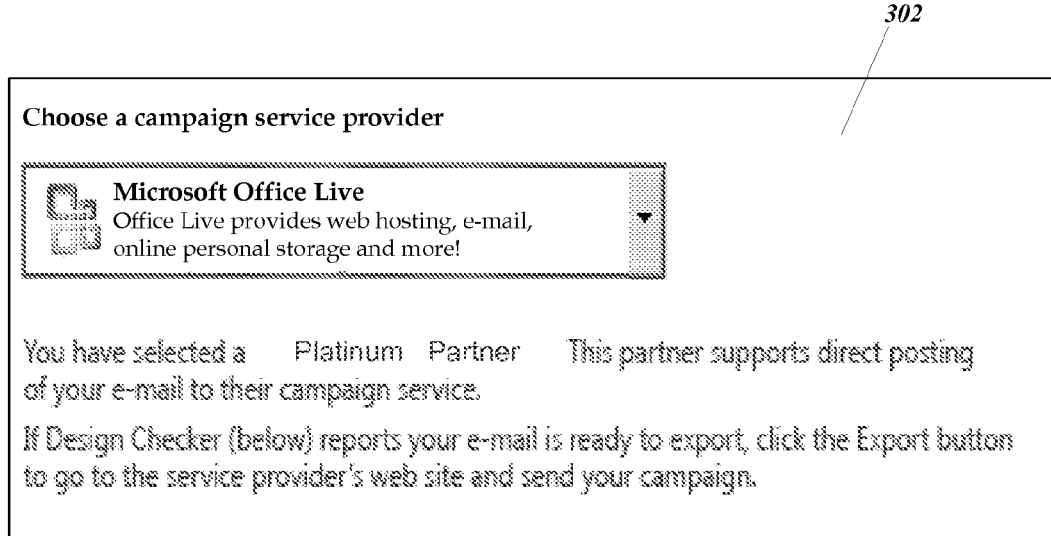
Figure 3F:
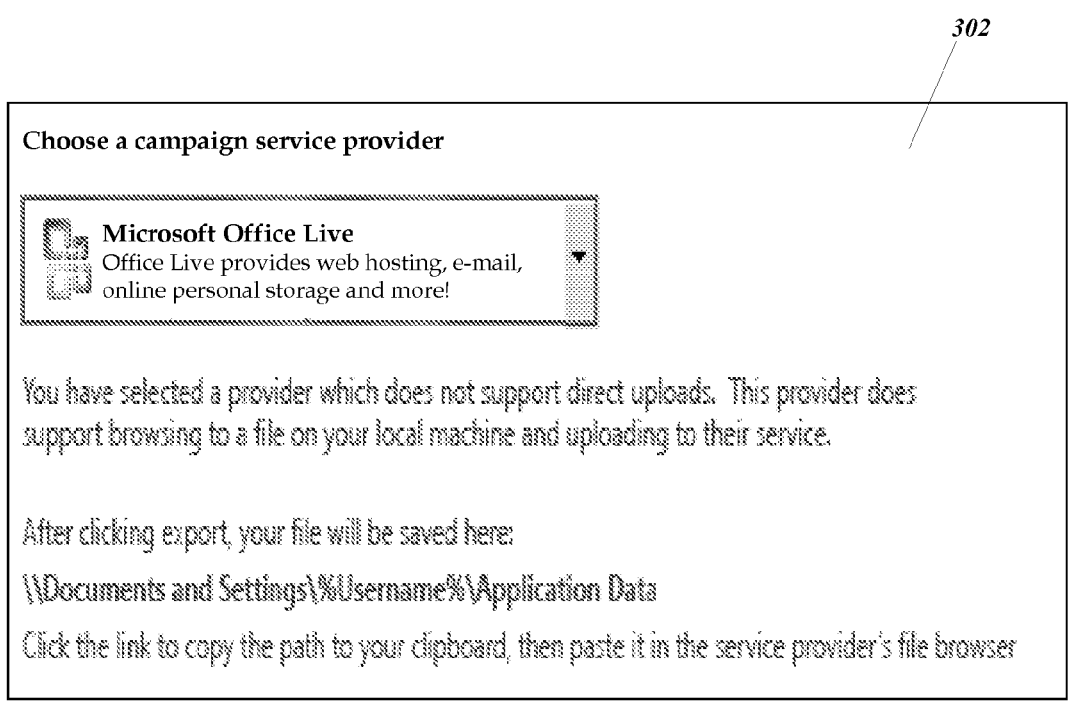

As shown in FIGS. 3E-3F, the search interface 302 can inform the user regarding available service features of a selected service provider returned by the API 214. Additionally, the user can be directed to an associated web site upon selecting a returned service provider. For example, a new browser window may open for a selected service provider web site. In one embodiment, a welcome screen at an associated web site can be used to acknowledge the use of an application (e.g., the publishing application) when the service provider client 206 was used to provide the relevant service provider data. For example, the redirector 210 can use data in the service provider request or a communication protocol (e.g., IP address) that includes application data associated with the application in use when the service provider client 206 requested service provider data. In an embodiment, the redirector 210 can be included as part of the server functionality or a separate component.

The computing environments described herein can be configured to include networking, security, and/or other communication functionality to provide an interactive environment for associated users. Accordingly, the environments and components include functionality to communicate with other computing devices, communication devices, and/or other systems and are not intended to be limited to the embodiments and examples described herein. Moreover, components can be configured to communicate via a wired, wireless, and/or combination of various communication networks.

The computing environments and systems described herein can be configured as a networked system that includes software, firmware, hardware, and other components to provide a distributed computing environment, such as a .NET framework for example. For example, components can be configured using Microsoft® Windows® SharePoint® services and Office® technology to provide a computing environment to share and use information. Additionally, while a certain number and configuration of components are shown, the other numbers of components and various configurations can be used. For example, a computing environment can include a plurality of computing devices, clients, servers, repositories, and/or other components.

Figure 4:
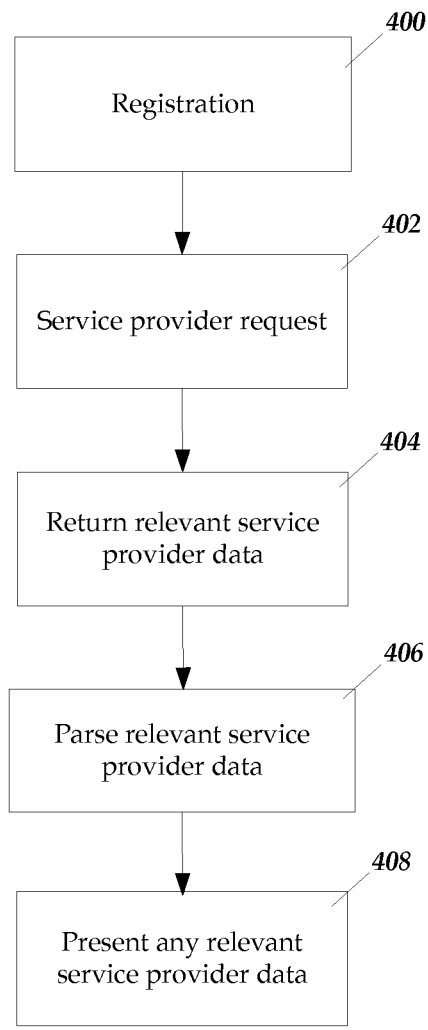
FIG. 4 is a flow diagram illustrating an exemplary process of providing service provider data.

FIG. 4 is a flow diagram illustrating an exemplary process of locating service provider data using a client, in accordance with an embodiment. The components of FIG. 1 are referred to in the description of FIG. 4, but other component configurations and functionalities are available. Additionally, while a number and order of operations are shown, other embodiments are available.

At 400, the client 104 can register with the server 106. For example, a user profile can be used to register the client 104 with one or more servers or other components. In one embodiment, as part of a registration process, and in order for the client 104 to gain visibility with an associated server, a location identifier can be used to identifier relevant service provider data repositories. For example, service provider data can be provided to the client 104 after registering with the server 106 and logging-in. Once registered and logged-in, the client 104 can be configured to present service provider data to a user.

At 402, the client 104 can operate to communicate a service provider request to the server 106. For example, the client 104 can send a request to the server 106 for XML service provider data, including any relevant metadata. In an alternative embodiment, a redirector can be used to direct the request to a particular server or other component. At 404, the server 106 can operate to return any relevant service provider data. For example, an API can be used to package XML service provider data according to a number of defined schema elements.

For example, the API can operate to package the service provider data as follows:

```
<?xml version="1.0" encoding="utf-8" ?>
-<OnlineProviderData>
 -<Tiers>
  -<Tier ID="0">
   <Heading>Titanium Providers (ID = 0)</Heading>
   <Description>These are the Titanium providers</Description>
  </Tier>
  -<Tier ID="1">
   <Heading>Platinum Providers (ID = 1)</Heading>
   <Description>These are the Platinum providers</Description>
  </Tier>
  -<Tier ID="2">
   <Heading>Turquiose Providers (ID = 2)</Heading>
   <Description>These are the Turquiose providers</Description>
  </Tier>
 </Tiers>
 -<Providers>
  -< Provider ID="90001" TierID="0" AcceptUpload="1" MaxUploadSize="500000">
    <Name>Provider 90001</Name>
    <Description>The is the description for e-mail provider 90001</Description>
    <PrimaryURL>redirID90001</PrimaryURL>
    <IconURL>redirID90001Icon</IconURL>
   </Provider>
  -< Provider ID="90002" TierID="0" AcceptUpload="1" MaxUploadSize="100000">
    <Name>Provider 90002</Name>
    <Description>The is the description for e-mail provider 90002</Description>
    <PrimaryURL>redirID90002</PrimaryURL>
    <IconURL>redirID90002Icon</IconURL>
   </Provider>
  -< Provider ID="90003" TierID="1" AcceptUpload="0" MaxUploadSize="500000">
    <Name>Provider 90003</Name>
    <Description>The is the description for e-mail provider 90003</Description>
    <PrimaryURL>redirID90003</PrimaryURL>
    <IconURL>redirID90003Icon</IconURL>
   </Provider>
  -<Provider ID="90004" TierID="2" AcceptUpload="0">
    <Name>Provider 90004</Name>
    <Description>The is the description for e-mail provider 90004</Description>
    <PrimaryURL>redirID90004</PrimaryURL>
    <IconURL>redirID90004Icon</IconURL>
   </Provider>
  -<Provider ID="90005" TierID="2">
    <Name>Provider 90005</Name>
    <Description>The is the description for e-mail provider 90005</Description>
    <PrimaryURL>redirID90005</PrimaryURL>
    <IconURL>redirID90005Icon</IconURL>
   </Provider>
 </Providers>
</OnlineProviderData>
```

With continuing reference to FIG. 4, at 406, the client 104 can operate to parse any received service provider data according to a grouping or other delineation implementation. For example, the client 104 can operate to parse returned service provider according to a provider name, advertising text, and/or level of association. At 408, the client 104 can operate to present the parsed service provider data in a gallery or other interactive interface. For example, the client 104 can operate to provide a drop-down list of relevant service provider including differentiating the service providers according to an advertising model or agreement. A user can select a service provider for more information and further interaction.

Exemplary Operating Environment

Figure 5:
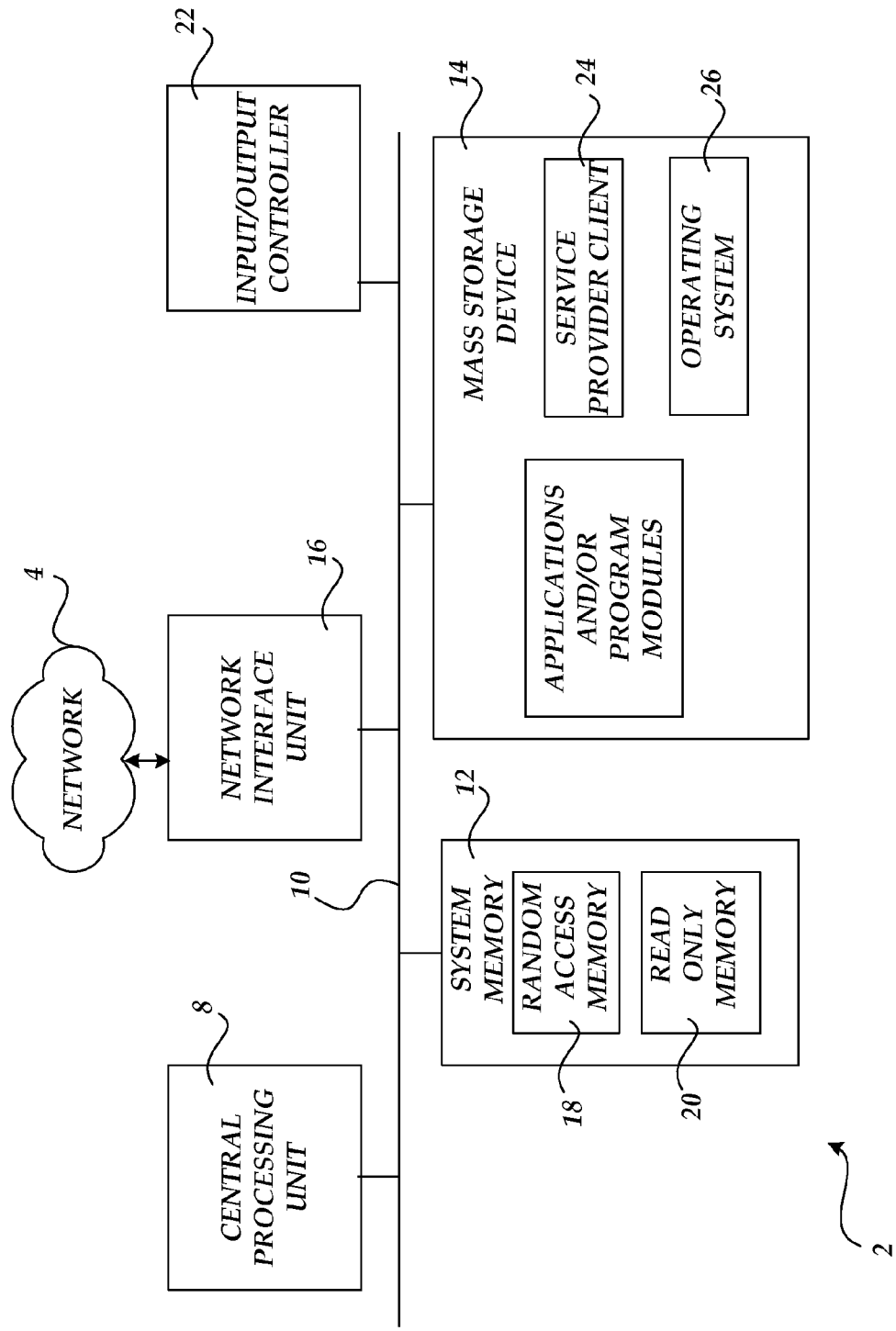
FIG. 5 is a block diagram illustrating an exemplary computing environment for implementation of various embodiments described herein.

Referring now to FIG. 5, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 5, an illustrative operating environment for embodiments of the invention will be described. As shown in FIG. 5, computer 2 comprises a general purpose desktop, laptop, handheld, tablet, or other type of computer capable of executing one or more application programs. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20.

The computer 2 further includes a mass storage device 14 for storing an operating system 32, application programs and other program modules. The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 4, such as a local network, the Internet, etc. for example. The computer 2 may connect to the network 4 through a network interface unit 16 connected to the bus 10. It should be appreciated that the network interface unit 16 may also be utilized to connect to other types of networks and remote computing systems. The computer 2 may also include an input/output controller 22 for receiving and processing input from a number of input types, including a keyboard, mouse, pen, stylus, finger, and/or other means. Similarly, an input/output controller 22 may provide output to a display, a printer, or other type of output device. Additionally, a touch screen can serve as an input and an output mechanism.

As mentioned briefly above, a number of program modules and data files may be stored in the mass storage device 14 and RAM 18 of the computer 2, including an operating system 32 suitable for controlling the operation of a networked personal computer, such as the WINDOWS operating systems from MICROSOFT CORPORATION of Redmond, Wash. The mass storage device 14 and RAM 18 may also store one or more program modules. In particular, the mass storage device 14 and the RAM 18 may store application programs, such as a word processing application 28, a spreadsheet application 30, e-mail application 34, publishing application, etc. As shown in FIG. 5, a service provider client 24 is included in the mass storage device 14.

It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A computing system including at least one processor and memory, the computing system configured to:
   provide a search interface, within context of one of a word processing application, a publishing application, a spreadsheet application, and a database application, to search for service providers associated with a hosted service;
   interact with the search interface to request a type of service provider based in part on a type of provider request;
   receive relevant service provider data based in part on the type of provider request and a location associated with the request;
   using a schema to parse the relevant service provider data comprising an accept upload parameter to control publication uploads and a maximum file size parameter associated with the accept upload parameter; and,
   using the parsed relevant service provider data to present a number of relevant service providers as part of providing a service provider gallery interface according to a service provider grouping.

2. The system of claim 1 further configured to expose the number of relevant service providers by providing a service provider search interface in the context of an end-user application and use the publication as part of one or more of the email campaign and marketing campaign hosted by the select service provider comprising a web hosting provider.

3. The system of claim 1 further configured to expose the number of relevant service providers by redirecting the provider request to a repository of service provider data including using the schema to parse the service provider data as part of populating the service provider gallery interface, wherein the schema further includes a provider name, and a tier heading, the system further configured to use an application programming interface (API) to communicate the relevant service provider data to a requesting client to organize and present in the service provider gallery interface and according to the schema.

4. The system of claim 3 further configured to expose the number of relevant service providers by redirecting the provider request to a marketplace provider database having service provider information.

5. The system of claim 1 further configured to expose the number of relevant service providers by using an API to package service provider data associated with the type of provider request.

6. The system of claim 1 further configured to expose the number of relevant service providers by presenting relevant service provider data delineated by a level of service.

7. The system of claim 1 further configured to expose the number of relevant service providers by presenting relevant service provider data according to a partner agreement.

8. The system of claim 1 further configured to expose the number of relevant service providers by requesting a list of service providers according to a region of interest associated with the location of an issuing request.

9. The system of claim 1 further configured to expose the number of relevant service providers by populating a gallery of service providers according to a partner level.

10. The system of claim 9 further configured to expose the number of relevant service providers by populating the gallery of service providers by grouping the number of service providers according to an advertising association between one or more partners.

11. The system of claim 1 further configured to expose the number of relevant service providers by using a configurable client application shared between resources of an application suite to request relevant service providers for a particular service.

12. The system of claim 11 further configured to expose the number of relevant service providers associated with a particular geographic region.

13. A computing-based method of presenting service provider data comprising:

issuing a service provider request within context of one of a word processing application, a publishing application, a spreadsheet application, and a database application, wherein the request includes a request location and application context data to search for service providers associated with a hosted service;

receiving relevant service provider data, wherein the relevant service provider data includes a provider name, services information, and association information;

using a schema to parse the relevant service provider data comprising an accept upload parameter to control publication uploads and a maximum file size parameter associated with the accept upload parameter to provide gallery data; and organizing the gallery data;

presenting the organized gallery data as part of displaying a service provider gallery interface.

14. The method of claim 13, further comprising using a schema to parse XML data comprising the service provider data.

15. The method of claim 13, further comprising organizing the gallery data according to a number of delineated partner levels.

16. The method of claim 13, further comprising issuing the service provider request and including the application context data in accordance with a search type.

17. A computer-implemented client coupled to at least one processor and memory, the client configured to provide service provider data by:

sending a request for service providers, wherein the request includes location information associated with the request and a service provider type;

receiving relevant service provider data associated with one or more relevant service providers, wherein the one or more relevant service providers correspond with the location information and service provider type;

using a schema to parse the relevant service provider data including an accept upload parameter to control publication uploads and a maximum file size parameter associated with the accept upload parameter; and presenting a gallery as part of displaying a service provider gallery interface that includes one or more of the relevant service providers identified by a level of association.

18. The client of claim 17 further configured to provide the relevant service provider data according to an application context and the select campaign service provider.

19. The client of claim 17 further configured to provide the relevant service provider data according to a search context.

* * * * *